March 24, 1959 C. GROOT 2,878,727
PROCESS AND APPARATUS FOR PRODUCING MOLDED ARTICLES
Filed Feb. 19, 1953 3 Sheets-Sheet 1
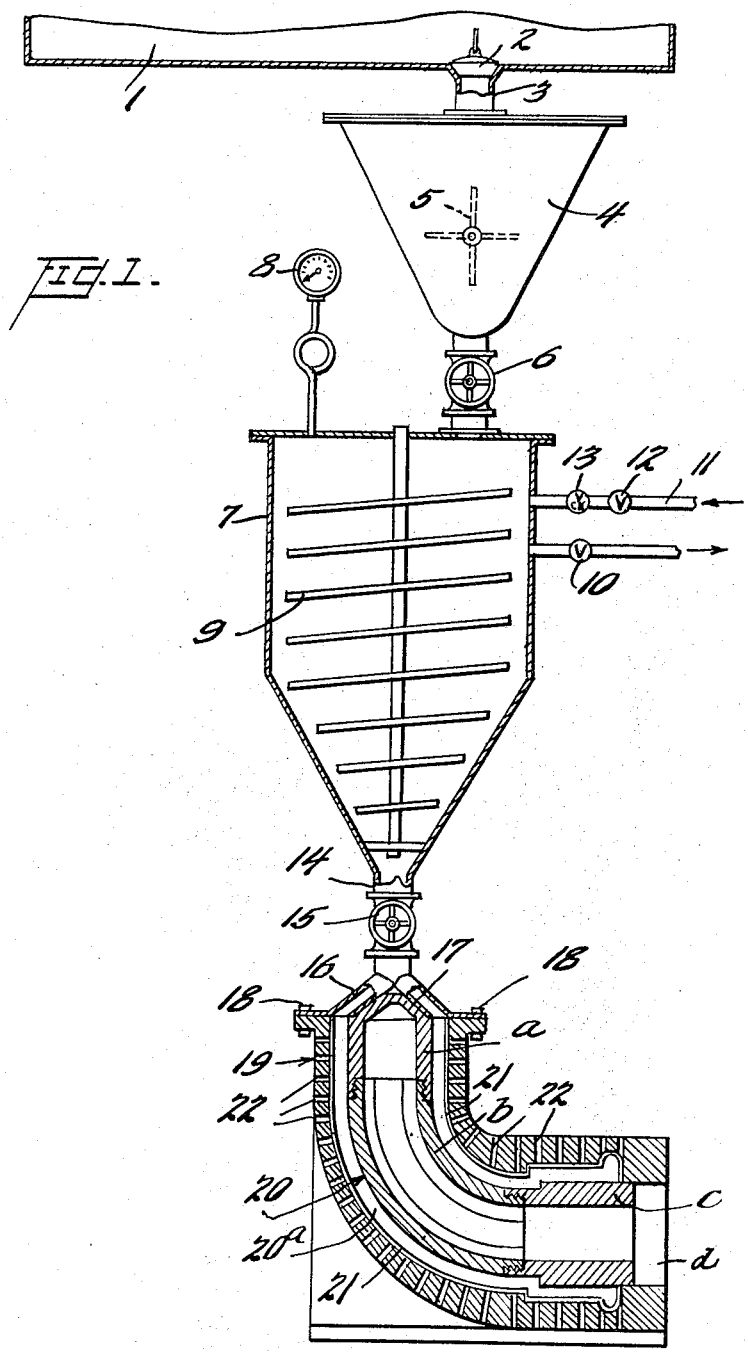

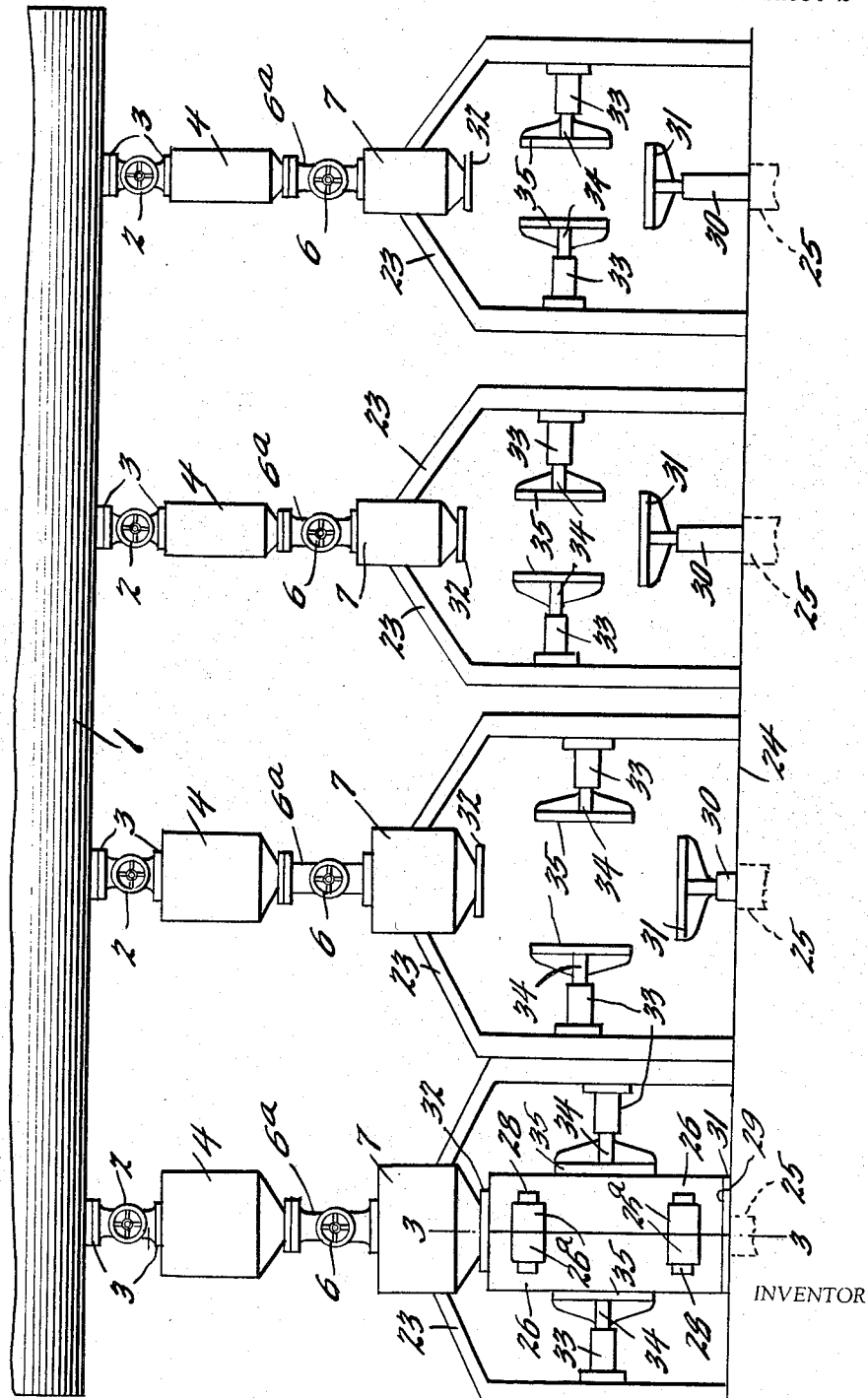

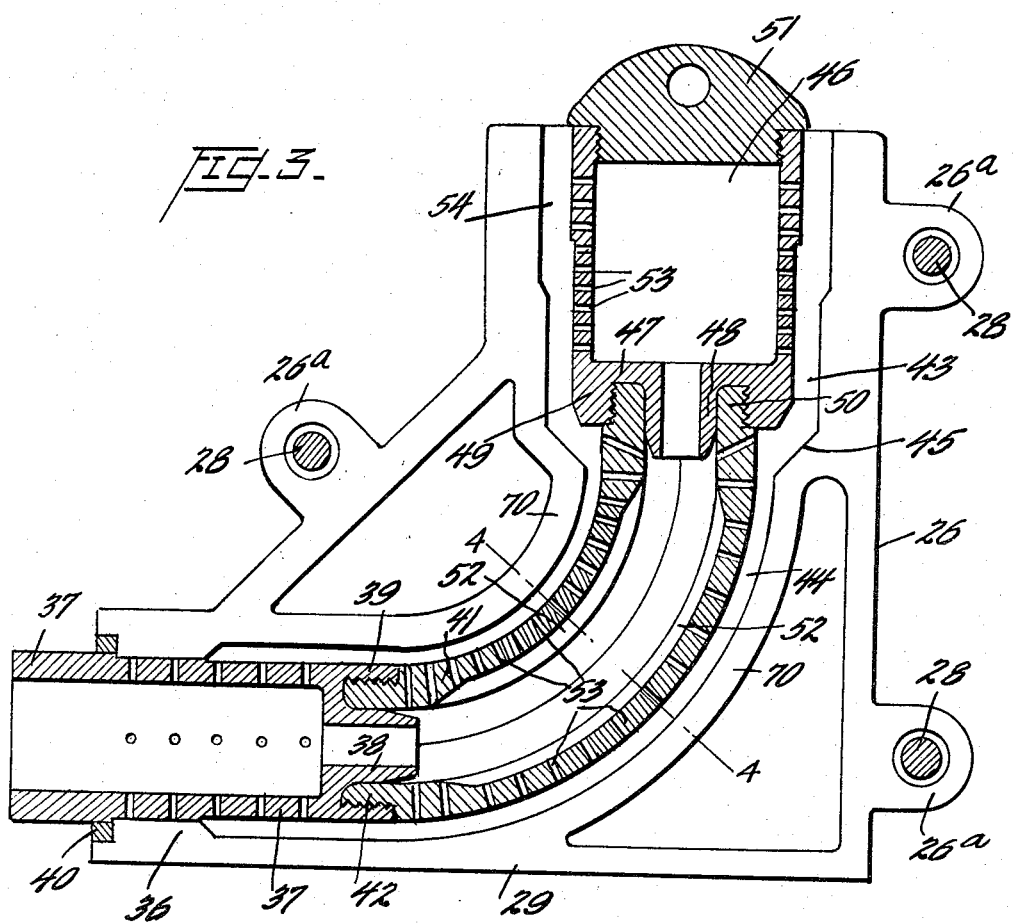
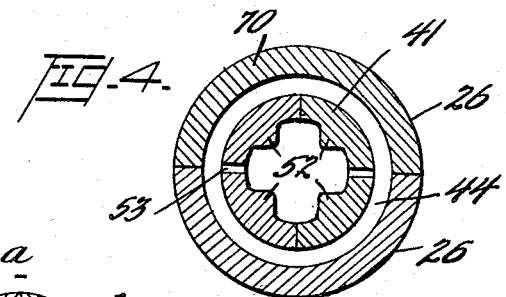
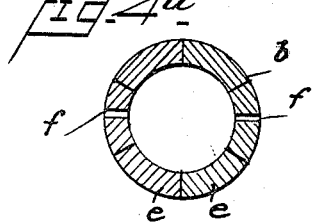

United States Patent Office 2,878,727
Patented Mar. 24, 1959

2,878,727

PROCESS AND APPARATUS FOR PRODUCING MOLDED ARTICLES

Cornelis Groot, Amsterdam, Netherlands

Application February 19, 1953, Serial No. 337,809

Claims priority, application Netherlands May 25, 1950

2 Claims. (Cl. 92—54)

This application is a continuation-in-part of my co-pending application 219,193, filed April 4, 1951, now abandoned (corresponding to an application filed in Holland May 25, 1950).

My invention relates to a process of and a press mold with core for mechanically manufacturing hollow articles from pasty masses containing fibres (especially asbestos fibres), hydraulic cement, and a relatively large amount of water, the pasty mass being brought under pressure into a pressure mold with core and the excess of water being removed through openings. If desired, further adhesive or binding agents, water-proofing agents, and fillers may be added to the mixture of fibres, cement and water before the watery mixture is introduced into the mold. Examples of these additions are emulsified binding, and/or water-proofing agents such as rubber, asphalt or other plastic substances in aqueous emulsion or mixtures of such materials. The additions are not of much importance, in general, but may be used when applying my new process.

My invention also may include the products and articles obtained by such process. The products made as described herein are more homogeneous and uniform than any heretofore made.

The process according to my invention enables the production of all desired products and articles such as pipes having bends therein, T-shaped pipes, Y-shaped pipes, and other moulded bodies from pasty materials such as asbestos fibres and cement, mortar and the like, satisfying the highest requirements and possessing numerous technical and economical advantages as compared with those obtained by means of the hitherto known processes.

The old processes require very complicated machines such as the known carton or plate machines, or the machines for pipes and so on. Other articles such as beams or girders, molded bodies, and their auxiliaries require much manual labor and time. All these disadvantages are avoided by my present invention. It is especially mentioned that my invention enables the production of machine-made pipes and their auxiliaries with sockets, bends, T-shaped articles and the like which up to the present time could only be made by manual labor.

The process according to my invention is characterised by the feature that the manufacture takes place by means of filtration of excess water under pressure, from the slurry of cement, asbestos fibre and excess water.

The process according to my invention may be carried out in such a manner that the raw material in the form of a flowable pasty mass is transferred under pressure into a mold which may be provided with a core, the walls of the mold and/or the core possessing apertures, channels or the like for discharge or removal of excess of liquid.

Finally, my invention comprises a process and apparatus in which the walls of the mold and/or of the core are perforated and lined or covered by a material which allows only a free-flowing liquid like water to pass but which holds back the grains and all undissolved solids.

In order to elucidate my invention an apparatus for carrying out the process is described by way of an example with reference to the accompanying drawing in which schematically is illustrated the apparatus for preparing a bent pipe having a bell or socket on its end, from asbestos cement mixture.

Referring to the annexed drawings,

Figure 1 shows a cored mold for forming a pipe elbow having a socket at its end, and the equipment for feeding a molding mixture thereto, including a storage tank, a mixing tank, a compressed air tank, and the interconnecting pipes and valves.

Figure 2 is a side elevation of a form of a complete apparatus within the scope of my invention for carrying out the process of this invention.

Figure 3 is a fragmentary vertical section of the mold itself on the line 3—3 of Figure 2.

Figure 4 is a detailed section on the line 4—4 of Figure 3.

Figure 4a is a section showing one way of dividing the bent part of the core, lengthwise, into six sections, which sections can be separately removed, after the excess water has been removed from the pasty mass in the mold.

In Figure 1 of the drawing, 1 is a rag or like stuff engine or any other apparatus for thoroughly mixing the constituents of the raw material. In the present instance, asbestos, cement and water are preferably used. These may be mixed in the appropriate proportions to give the desired consistency. For making a pipe elbow as shown, a batch of 12 parts of asbestos fibre, 88 parts Portland cement and 250 parts of water (all by weight) can be mixed in tank 1. The bottom of the tank 1 is provided with an outlet with conical valve 2 for delivering the desired paste. By means of the connection 3 the paste flows to a measuring tank 4 provided with stirring means 5. The tank 4 is provided at the bottom with a draining valve 6 through which the paste is run into the tank 7. Tank 7 is provided with a manometer 8, a stirring device 9, a valve 10 for removing air and a pipe 11 for supplying air under pressure. In this supply pipe 11 a regulating valve 12 and a check valve 13 are located. The lower part of the tank 7 for air under pressure has a conical shape and connects with a pipe 14 provided with a delivery valve 15 for the paste. The bottom end of pipe 14 connects with an outer dividing cone part 16 in which an inner dividing cone part 17 is located. These two cone parts are connected to a mold 19 by bolts 18, the mold being provided with a core 20. Between the mold 19 and the core 20 is located a free space 20a which corresponds to the shape of the object to be made. On the inner side of the mold 19 is a coating or covering of filtering material 21, e. g. a fabric held to the inner surface of the mold by means of an adhesive. This may be one or more thicknesses of common cotton fabric.

When preparing an object by means of the apparatus of Figure 1, a measured amount of the paste is transferred from the tank 1 into the tank 4, after which the stirring device 5 is set in motion to thoroughly mix the slurry. The paste flows from the tank 4 into the tank 7 by opening the delivery valve 6, the air escaping through the open valve 10. Thereupon the delivery valve 6 and the air valve 10 are closed and the stirring means 9 is brought into action. Immediately thereafter valve 12 is opened so that air under pressure is conducted into the tank 7. The manometer 8 indicates the air pressure in the tank 7. Thereafter the valve 15 is opened and the paste flows between the dividing cone parts 16 and 17 into the mold 19 and the space 20a between the mold 19 and the core 20 is completely filled. Pressure (e.g. 6 atmospheres) exists in tank 7, driving the slurry downwardly into the mold 19, while the excess water is driven out through the walls of the mold 19, which walls are perforated as shown at 22, with many small holes, the perforated mold walls and the cotton fabric lining same and thus constituting a filter. The pressure need only be maintained for the very short time, e.g. 10 to 30 seconds or more after the slurry has all flowed into the mold, after which the valves 12 and 15 are closed and the mold may be removed by removing bolts 18.

The molding space, i.e. the space between the mold walls and the core, is of a fixed size and shape, i.e. is of the size and shape of the pipe elbow to be formed, e.g. with its bell end, and this molding space is completely closed on all sides and at its ends, except at its inlet end, although perforated to allow excess water to flow out through such perforations. And the thickness of the walls of the pipe elbow to be produced, i.e. the distance between the mold wall and the core, is fixed and invariable.

The mold is then opened and the halves of the mold separated, leaving the partly dewatered mass of cement, asbestos and water, already shaped in the mold, and the cement in this mass will then already have undergone the initial set. The core can then be separated into three parts, a straight cylindrical (or straight-tubular) upper extension section or part *a*, at the top, a curved-cylindrical (or preferably curved-tubular) intermediate section or part *b*, and a straight lower extension section or part *c*, having a bell portion *d* at its outer end. The part *b* is preferably divided lengthwise into several peripheral wall portions or sections *e* which are separately removable (see Fig. 4a). The lower end of the part *a* is internally threaded, and the inner end of the part *c* is also internally threaded, both of these screwing upon the ends of part *b*, so that the several lengthwise portions of the part *b* will thereby be held in assembled relation, and the three parts of the core will be held together by these two screw joints. As has already been indicated, both the core and the mold may have perforated walls, and core wall perforations are indicated at *f* in Fig. 4a.

After the molding step, and after blowing the compressed air through the wet molded product, and after waiting for 10 to 30 seconds, the bolts 18 are removed, the parts *a* and *c* of the core are unscrewed and removed, and the portion *e* constituting part *b* is separately removed. The pipe so made will then be placed in a suitably damp atmosphere for a day or more to harden by continuation of the chemical hydration of the hydraulic cement, which had already started in the initial setting.

In setting up the apparatus, the mold and the core are suitably supported, and the halves of the mold pressed together as shown below.

I referred above to the perforations 22. These may be e.g. 5 mm. apart (between centers) and have a diameter of 2 mm. These figures also apply to the perforations 53 in the perforated tubular cores in Figure 3, below.

In the view of the apparatus of this invention, as shown in Figure 2, there is provided an elongated tank 1 with suitable agitators therein. And at spaced intervals along the length of the bottom of this tank are outlet pipes 3, each controlled by a valve 2 or by any suitable closing device. This tank contains the flowable uniform mixture of asbestos, hydraulic cement, and water, which is to be used in forming the pipe joint (elbow). Each of the pipes 3 delivers to a mixing and measuring vessel indicated in general at 4, and this vessel has an outlet pipe 6a controlled by valve 6. From the valve 6, the mixture passes to an agitating and expressing device operated by air pressure indicated in general at 7 and similar to 7 in Figure 1.

These expressing devices 7 are held upon a series of supports 23, which rest on a floor 24. Centrally between the supports and below the floor is fixed a cylinder 25 operating by hydraulic means (not shown) for supporting the mold and core at the proper level. The mold consists of two cooperating halves 26 of like construction, one being for the left hand side of the mold and the other being for the right hand side thereof. See also Figure 3. Each of the members 26 is provided with a plurality of eyes 26a cast on the mold to form integral parts thereof. The eyes on one half of the mold aline with the eyes on the other half so that securing bolts 28 may be passed through these eyes to secure the halves together. The bottom parts of the mold halves extend horizontally to provide a base 29. In each of the cylinders 25 (Figure 2) there operates a plunger 30, carrying on its upper end a pressure plate 31, whereon the mold bottom 29 rests. The tanks 7 each has on its bottom a pressure plate 32 to engage the smooth top of the mold. Carried by each of the frame members 23 is a hydraulic cylinder 33 having a piston 34, carrying a pressure plate 35. These cylinders are alined opposite each other, and the pressure plates 35 engage the sides of the mold halves to press them firmly together, so that leakage at the joint, around which the mold has met, is prevented.

The interior of the mold (see Figure 3) is constricted at its lower end, as indicated at 36, and in this constricted portion is mounted a pipe 37 having a nipple 38 extending centrally therefrom into the lower end of the curved part 41 of the core and also having an annular rib 39 threaded internally. A gasket 40 may be provided to prevent leakage around the pipe 37. At 41 is shown the curved part of the hollow core, which corresponds in general formation to the shape of the interior of the curved part of the mold. At its lower end this core is provided with a reduced and threaded extension 42. This extension screws into the threaded pipe portion 39 and forcibly slides over the nipple 38, which is tapered to give a good fit at this point. The upper end of the mold space is internally enlarged as at 43. The enlarged portion 43 is connected to the space 44 between the outer surface of the curved core and the inner surface of the mold by a beveled portion 45. This forms the bell on the top end of the elbow. In the upper end 43 is fitted an enlarged core member 46 having a bottom 47 from which extends downwardly a nipple 48 corresponding to the nipple 38 and internally threaded portion 49 corresponding to the threaded portion 39. The upper end of the curved part of the core is provided with a reduced and externally threaded portion 50. The upper end of the member 46 is preferably internally threaded (in practice a left hand thread) and a supporting yoke or head 51 is threaded into this upper end in order to hold the member 46 and the core 41 in proper position during the closing of the mold around the core.

The core 41 is preferably provided with internal reinforcing ribs 52, and the side wall of the core 41 is provided with a multiplicity of small perforations 53 to permit the escape inwardly of water during the filling of the space around the core with the thin slurry. The entire core has a wrapping of filtering material such as a fabric.

In operation, compressed air blown into the expressing device 7 forces the mixture down into the annular space 54, surrounding the top of member 46 so that it may flow into the space 43 between the core and the inner surface of the mold and the mixture then flows down through the tapered or beveled portion 45, and into space 44. Under the pressure exerted on the composition excess water will escape through the many perforations 53 and flow out through the pipe 37.

When the pipe elbow so produced has been sufficiently dewatered by the air pressure from tank 7, and has sufficiently set to be handled with safety, the mold can be opened and the halves moved away from each other. The part 46 is unscrewed (at 50) from the curved part 41, and the part 46 is then removed. Then the pipe 37 will be unscrewed from 41 (at 42) and this pipe withdrawn. Then the several sections of the curved part of the core, 41 can be slid upwardly and out through the bell 43—54. The formed pipe is then stored to harden as above.

From the above it appears that both the apparatus and process are considerably much more simple and more economical than the known apparatus and processes and that a very considerable increase of production is obtained. Further, it is remarked that all products of the same kind have the same specific gravity and the same strength. This stands in contradiction with the processes used hitherto.

When using fibres of a lower quality, still, products are obtained of which the quality is not poorer than those obtained with the known methods. The dimensions of the objects are very exact and the finishing work is limited to a minimum. Less utensils are necessary and much time is saved. Finally, it is possible to include characters or designs in the molds so that it is possible to provide the objects with a trademark while preparing the same.

In Figure 1 I have shown the mold as having perforated walls through which excess water can be forced out, and in Figure 3 I have shown the core as tubular and perforated. Both the mold and the core can be perforated, if desired.

In some instances I can add an asphalt emulsion or an emulsion of resinous particles to the cement, asbestos, water mixture. Solid pulverulent aggregates can also be added, e.g. fine sand.

In the above I have given one formula for making up the thin slurry for introduction into the tank 1. Considerable variation in the proportions is permissible e.g. (by weight) the ratio of cement to asbestos fiber can vary between 20:1 and 4:1 (best between 10:1 and 6:1), and the amount of water can vary between about 2 and about 4 times the weight of the solids. This mixture can have sand or similar aggregate added, and/or other fibre which may be mineral or organic. If desired, latex, asphalt emulsion etc. can be added to the cement-asbestos-water slurry, to improve the water-resisting properties of the products produced, the amount of rubber, asphalt or resins being, for example, between 7% and 25% of the weight of the cement used.

It will be understood that while in Figure 2 of the drawing I have shown measuring tanks 4 of several different sizes, it will be understood that such tanks are preferably interchangeable and the several tanks, at any particular time then in service, can all be of the same size. The measuring tank, to be used should best always be of sufficient size to hold just enough of the thin cement and asbestos grout to produce one pipe by molding.

The pipes, elbows, or other devices are far more uniform in composition and hence stronger than any that can be produced by the processes heretofore used. The invention has the advantage of requiring only a minimum of hand labor, since the entire process (except the ageing) is carried out in one apparatus.

I claim:

1. In a mold having a plurality of separable external mold parts for the molding of hollow pipe sections and like articles; a core member for location within the interior of said mold parts, said member comprising a core section having spaced ends and being divided into a plurality of peripheral portions extending between said ends, and at least one extension section connected to said core section at one of said ends thereof, a part of said extension section embracing said peripheral portions at the corresponding end of said core section to retain the same in assembled condition, whereby upon separation of said external mold parts said extension section may be disconnected from said core section and said peripheral sections may be disassembled, at least one additional extension section being disposed at the other end of said core section, said additional extension section being provided with a part embracing the other end of said core section to coact with said one extension section in retaining said peripheral portions of said core section in assembled condition.

2. In a mold having a plurality of separable external mold parts for the molding of hollow pipe sections and like articles; a core member for location within the interior of said mold parts, said member comprising a core section having spaced ends and being divided into a plurality of peripheral portions extending between said ends, and at least one extension section connected to said core section at one of said ends thereof, a part of said extension section embracing said peripheral portions at the corresponding end of said core section to retain the same in assembled condition, whereby upon separation of said external mold parts said extension section may be disconnected from said core section and said peripheral sections may be disassembled, said core section being hollow, said embracing part of said extension section being provided with a nipple located centrally of said embracing part and adapted to extend into said hollow core section for communication therewith when said extension section is connected thereto.

References Cited in the file of this patent
UNITED STATES PATENTS

| | | |
|---|---|---|
| 1,079,774 | Lappen | Nov. 25, 1913 |
| 1,159,895 | Canda | Nov. 9, 1915 |
| 1,394,786 | Pike | Oct. 25, 1921 |
| 1,618,146 | Buel | Feb. 15, 1927 |
| 1,715,942 | Morgan | June 4, 1929 |
| 2,694,349 | Hyulian | Nov. 16, 1954 |

FOREIGN PATENTS

| | | |
|---|---|---|
| 269,365 | Great Britain | Apr. 21, 1927 |
| 286,498 | Great Britain | Mar. 8, 1928 |